United States Patent
Kim et al.

(10) Patent No.: US 7,151,071 B2
(45) Date of Patent: Dec. 19, 2006

(54) METHOD FOR PREPARATION OF A SOLID TITANIUM CATALYST FOR OLEFIN POLYMERIZATION

(75) Inventors: Sang-Yull Kim, Seosan-shi (KR); Ki-Hwa Lee, Daejeon (KR); Chun-Byung Yang, Daejeon (KR); Ho-Sik Chang, Daejeon (KR)

(73) Assignee: Sansung Atofina Co., Ltd., Chungcheongnam Province (KR)

( * ) Notice: Subject to any disclaimer, the term of this patent is extended or adjusted under 35 U.S.C. 154(b) by 80 days.

(21) Appl. No.: 11/046,130

(22) Filed: Jan. 28, 2005

(65) Prior Publication Data
US 2005/0215422 A1 Sep. 29, 2005

(30) Foreign Application Priority Data
Jan. 28, 2004 (KR) .................... 10-2004-0005430

(51) Int. Cl.
*B01J 31/00* (2006.01)
(52) U.S. Cl. ............... 502/103; 502/102; 502/115; 502/118; 502/126; 502/128
(58) Field of Classification Search ........... 502/103, 502/102, 115, 118, 126, 128, 150
See application file for complete search history.

(56) References Cited

U.S. PATENT DOCUMENTS

| | | | | |
|---|---|---|---|---|
| 4,900,706 A | * | 2/1990 | Sasaki et al. ............ 502/116 |
| 5,173,540 A | * | 12/1992 | Saito et al. ............ 525/247 |
| 5,849,654 A | * | 12/1998 | Fushimi et al. ............ 502/125 |
| 5,902,765 A | * | 5/1999 | Takahashi et al. ........ 502/127 |
| 6,096,844 A | * | 8/2000 | Fushimi et al. ............ 526/128 |
| 6,521,560 B1 | * | 2/2003 | Kojoh et al. ............ 502/104 |
| 6,884,748 B1 | * | 4/2005 | McCullough ............ 502/117 |

* cited by examiner

Primary Examiner—Karl Group
(74) Attorney, Agent, or Firm—Meyertons, Hood, Kivlin, Kowert & Goetzel, P.C.; Eric B. Meyertons

(57) ABSTRACT

The present invention relates to a method for preparing a solid titanium catalyst for olefin polymerization. The method for preparing a solid titanium catalyst for olefin polymerization according to the present invention comprises: preparing a magnesium compound solution by dissolving magnesium halide compound in a solvent mixture of cyclic ether and one or more of alcohol; preparing a carrier by adding titanium halide compound to said magnesium compound solution, then elevating the temperature of the solution and aging the solution to precipitate particles, and then adding titanium halide compound thereto for further reaction; preparing a catalyst by reacting said carrier with titanium compound and electron donor; and washing said catalyst with halogenated saturated hydrocarbon. According to the method of the present invention, a catalyst having high activity can be obtained and polyolefin produced by using the catalyst prepared by the method of the present invention has high stereoregularity, relatively easily compared with the conventional method.

4 Claims, No Drawings

METHOD FOR PREPARATION OF A SOLID TITANIUM CATALYST FOR OLEFIN POLYMERIZATION

BACKGROUND OF THE INVENTION

1. Field of the Invention

The present invention relates to a method for preparing a solid titanium catalyst for olefin polymerization, which can provide a solid catalyst having high activity, and by using said catalyst polyolefin with high stereoregularity can be produced easily compared with the conventional method.

2. Description of the Related Art

Many titanium-based catalysts for olefin polymerization containing magnesium and process for producing such catalyst have been reported in the art related to the present invention. For instance, some methods which obtain a magnesium solution by reacting a magnesium compound with an electron donor such as an alcohol, amine, ether, ester or a carboxylic acid in the presence of hydrocarbon solvent are disclosed, and among them specifically the use of an alcohol is disclosed in U.S. Pat. Nos. 4,330,649 and 5,106,807, and Japanese Laid-Open Sho-58-83006, etc. Also, U.S. Pat. Nos. 4,315,874, 4,399,054 and 4,071,674 disclose a method for preparing a magnesium solution. As for ether compound, tetrahydrofuran, which is one of cyclic ether, has been variously used for a magnesium chloride compound such as in U.S. Pat. No. 4,482,687, as an additive for a cocatalyst such as in U.S. Pat. No. 4,158,642 and as a solvent such as in U.S. Pat. No. 4,477,639.

Further, U.S. Pat. Nos. 4,347,158, 4,422,957, 4,425,257, 4,618,661 and 4,680,381 disclose a method for preparing a catalyst comprising the steps of adding a Lewis acid compound such as aluminum chloride to a magnesium chloride support and grinding the mixture.

As shown above, there have been many catalysts for olefin polymerization and various polymerization methods using the same reported so far, however those methods need to be improved further in view of catalyst activity and stereoregularity of the polymer produced. Therefore, there are still needs for further researches to increase catalyst activity for reducing the production cost, and to improve polymer properties such as stereoregularity by improving the catalyst used in the polymerization.

SUMMARY OF THE INVENTION

The object of the present invention is to provide a method of preparing a novel solid titanium catalyst for olefin polymerization which has high catalyst activity, and by using said catalyst, polyolefin with high stereoregularity can be produced easily.

The method of preparing a solid titanium catalyst for olefin polymerization comprises the steps of:

(1) preparing a magnesium compound solution by dissolving magnesium halide compound in a solvent mixture of cyclic ether and one or more of alcohol;

(2) preparing a carrier by adding titanium halide compound to said magnesium compound solution at a temperature range of −10 to 30° C. with a molar ratio of the titanium halide compound to the cyclic ether being 3.0 to 10, then elevating the temperature of the solution and aging the solution to precipitate particles, and then adding titanium halide compound thereto for further reaction;

(3) preparing a catalyst by reacting said carrier with titanium compound and electron donor; and (4) washing said catalyst with halogenated saturated hydrocarbon.

In the step (1), the magnesium halide compound used to prepare the magnesium compound solution can be selected from magnesium dihalide such as magnesium chloride, magnesium iodide, magnesium fluoride and magnesium bromide; alkyl magnesium halide such as methylmagnesium halide, ethylmagnesium halide, propylmagnesium halide, butylmagnesium halide, isobutylmagnesium halide, hexylmagnesium halide and amyl magnesium halide; alkoxy magnesium halide such as methoxymagnesium halide, ethoxymagnesium halide, isopropoxymagnesium halide, butoxymagnesium halide and octoxymagnesium halide; or aryloxymagnesium halide such as phenoxymagnesium halide and methylphenoxymagnesium halide. The magnesium compound can be also effectively used as a mixture of two or more selected from the above or as a complex with other metals.

The preparation of a magnesium compound solution in the step (1) may be carried out in the presence of hydrocarbon solvent. As for the hydrocarbon solvent, for example, aliphatic hydrocarbon such as pentane, hexane, heptane, octane, decane and kerosene; alicyclic hydrocarbon such as cyclohexane and methylcyclohexane; aromatic hydrocarbon such as benzene, toluene, xylene and ethylbenzene, and the like can be used.

The cyclic ether, which is used for preparing the magnesium compound solution in the step (1), is a cyclic ether having 3–6 carbon atoms in the ring or its derivatives, and, for example, particularly tetrahydrofuran and 2-methyl tetrahydrofuran may be preferred. The most preferred cyclic ether is tetrahydrofuran.

The alcohol compound, which is used for preparing the magnesium compound solution in the step (1), is a mono- or polyhydric alcohol having 1–20 carbon atoms, preferably having 2–12 carbon atoms.

The molar ratio of the magnesium to the cyclic ether in the step (1) for preparing the magnesium compound solution is 1 to 20, preferably about 2 to 10. When this molar ratio being less than 1, there is a difficulty in obtaining desired catalyst particles effectively, and when this molar ratio being more than 20, the magnesium compound becomes hardly dissolved. Therefore, in the case of this molar ratio being beyond the range of 1 to 20, there is a problem in controlling the size and shape of catalyst particles.

The temperature for dissolving the magnesium compound to prepare the magnesium compound solution in the step (1) may be varied depending on type and amount of the cyclic ether and the alcohol used therein. Preferably, the dissolution of the magnesium compound can be carried out at room temperature to 200° C., and more preferably at about 50–150° C.

In the step (2), the titanium compound added to the magnesium compound solution prepared in the step (1) for preparing the carrier is preferably a compound represented by the following general formula (I):

$$Ti(OR)_a X_{(4-a)} \quad (I)$$

wherein, R is an alkyl group having 1–10 carbon atoms, X is a halogen atom, and a is an integer of 0–3.

In the step (2), the titanium halide compound is firstly added to the magnesium compound solution at a temperature of −10 to 30° C. with a molar ratio of the titanium halide compound to the cyclic ether being 3.0 to 10, wherein the reason for specifying the range of temperature and molar ratio is to prevent particle formation and precipitation in the solution. Preventing the formation and precipitation of the particles is important for controlling the shape of the carrier. When the first addition of the titanium halide compound is completed, then the temperature of the solution is elevated and the solution is aged to precipitate particles at the elevated temperature. After precipitating particles, secondly adding a titanium halide compound is carried out, which can improve the production yield of the catalyst. The suitable temperature range for the second addition of the titanium halide compound is 10–100° C.

In the step (3), the reaction of the carrier prepared in the step (2) with a titanium compound in the presence of an electron donor to give a catalyst is preferably carried out twice, or three times or more. Such multiple reaction is carried out in the manner of reacting the carrier with a titanium halide compound or together with a suitable electron donor, and then reacting the slurry remained after decanting liquid mixture with a titanium compound and an electron donor again.

The electron donor used for preparing the catalyst in the step (3) may be a compound which contains oxygen, nitrogen or phosphorous. For example, organic acid, ester of an organic acid, alcohol, ether, aldehyde, ketone, amine, amine oxide, amide and phosphoric ester can be used as an electron donor, and more specifically, alkyl ester of benzoic acid and derivatives thereof such as ethyl benzoate, ethyl bromobenzoate, butyl benzoate, isobutyl benzoate, hexyl benzoate and cyclohexyl benzoate, and dialkyl phthalate having 2–10 carbon atoms and derivatives thereof such as diisobutyl phthalate, diethyl phthalate, ethyl butyl phthalate and dibutyl phthalate can be used as an electron donor.

In the step (4), the catalyst prepared in the step (3) is washed with a halogenated saturated hydrocarbon for 1–5 times, preferably 1–3 times. The temperature during the washing is preferably 10–120° C., more preferably 20–100° C. When the temperature during the washing is under 10° C., removing inactive titanium or atactic titanium from the catalyst is undesirably insufficient, and when the temperature is over 120° C., the advantegeous titanium or organic material for improving catalyst activity and stereoregularity may be also removed undesirably.

The halogenated saturated hydrocarbon used in the step (4) may be a compound which has 1–10 carbon atoms and contains at least one halogen atom such as chloride, bromide, fluoride and iodide. For example, ethyl chloride, ethyl dichloride, chloroform, tert-butyl chloride, tetrachloromethane, ethyl bromide, tert-butyl iodide, n-butyl bromide, n-butyl iodide or n-butyl fluoride or mixtures thereof may be used. The most preferred is ethyl dichloride.

The solid complex titanium catalyst produced according to the method of the present invention can be advantageously used in ethylene (co)polymerization. As for a comonomer for the copolymerization, α-olefin having 3 or more carbon atoms such as propylene, 1-butene, 1-pentene, 4-methyl-1-pentene or 1-hexene is used.

The solid complex titanium catalyst produced according to the method of the present invention can be prepolymerized with ethylene or α-olefin before using it as a component of the polymerization reaction. The prepolymerization can be carried out in the presence of hydrocarbon solvent (for example, hexane), said catalyst and organoaluminum compound (for example, triethylaluminum), at sufficiently low temperature and under the pressure of ethylene or α-olefin. The prepolymerization can help to improve the shape of polymers after polymerization since prepolymers can surround the catalyst and the shape of the catalyst can be kept well thereby. After the prepolymerization, the weight ratio of the polymer to the catalyst is generally 0.1 to 20.

DETAILED DESCRIPTION OF THE PREFERRED EMBODIMENTS

Hereinafter, the present invention is described further in detail, with reference to the following examples, however, the present invention is by no means limited by those illustrative examples.

EXAMPLE 1

Preparation of a Solid Catalyst for α-olefin Polymerization (1) Preparation of a Magnesium Compound Solution To a 500 L reactor, equipped with a mechanical stirrer and substituted with nitrogen atmosphere, 6 kg of $MgCl_2$, 90 kg of toluene, 7 kg of tetrahydrofuran and 12 kg of butanol were added, and the temperature of the mixture was elevated to 110° C. with stirring at 70 rpm and maintained for 1 hour to give a magnesium compound solution.

(2) Preparation of a Carrier

After cooling the magnesium compound solution prepared to 15° C., 13 kg of $TiCl_4$ was added (first addition) thereto, then the temperature of the reactor was elevated to 60° C. over 1 hour, and the mixture was aged for 10 minutes. To the mixture, 5 kg of $TiCl_4$ was added (second addition) over 40 minutes at the rate of 0.13 kg/min and the mixture was aged, then allowed to stand for 15 minutes to settle the carrier down, and the supernatant fluid was removed. To the slurry remained in the reactor, 50 kg of toluene was added, then the stirring, settling and supernatant fluid removing procedure as above was repeated twice, and the residue was washed to give a carrier.

(3) Preparation of a Catalyst

To the carrier prepared above, 32 kg of toluene and 40 kg of $TiCl_4$ were added with stirring at 60 rpm, then the temperature of the reactor was elevated to 110° C. over 1 hour, the mixture was aged for 1 hour and allowed to stand for 15 minutes to settle precipitates down, and the supernatant fluid was removed. Further, 52 kg of toluene, 34 kg of $TiCl_4$ and 2 kg of diisobutyl phthalate were added thereto. The temperature of the reactor was elevated to 120° C. and maintained for 1 hour, then the mixture was allowed to stand for 15 minutes to remove the supernatant fluid, and again, thereto added were 32 kg of toluene and 60 kg of $TiCl_4$. The mixture was stirred for 30–90 minutes and allowed to stand, and the supernatant was removed to give a catalyst slurry.

(4) Washing Catalyst with Halogenated Saturated Hydrocarbon

The catalyst slurry prepared above was washed with 40 L of ethyl dichloride at 90° C. twice, and then with 40 L of purified hexane at 50° C. for 4 times and at the room temperature for 3 times.

The catalyst prepared according to the present invention as described above comprised 2.2 wt % of titanium (Ti) and 18.8 wt % of magnesium (Mg), and the yield of the catalyst preparation was 120%. Other informations are summarized in Table 1 below. The catalyst composition was analyzed by ICP.

Polymerization

In a glove box in which nitrogen atmosphere is maintained, 10 mg of the catalyst prepared above was weighed and placed into a glass bulb, and the glass bulb was sealed. The bulb was mounted in a 2 L high-pressure reactor so that the glass bulb can be broken with the start of stirring to initiate the reaction. The high-pressure reactor was purged with nitrogen for 1 hour to have dry nitrogen atmosphere. To the reactor, triethylaluminum and cyclohexylmethyldimethoxysilane as an external electron donor were added with the molar ratios of Al/Ti being 450 and Si/Al being 0.1, and the reactor was closed hermetically. 1000 ml of hydrogen was added and then 1,200 ml of liquid propylene was added to the reactor by using a syringe pump, and stirring was started to break the glass bulb and initiate the polymerization reaction while raising the temperature of the reactor to 70° C. over 20 minutes. The polymerization reaction was carried out for 1 hour. After the polymerization reaction, unreacted propylene was vented out, and the temperature of the reactor was lowered to the room temperature. The polymer produced was dried in a vacuum oven at 50° C. and weighed, and NMR pentad analysis to the polymer was carried out. The results are represented Table 1 below.

EXAMPLE 2

The preparation of a catalyst was carried out in the same manner as in Example 1, except that the number of washing the catalyst with ethyl dichloride was 3 times in the step (4). With the catalyst prepared, polymerization was carried out in the same manner as in Example 1. The results are represented in Table 1.

EXAMPLE 3

The preparation of a catalyst was carried out in the same manner as in Example 1, except that the number of washing the catalyst with ethyl dichloride was 1 time in the step (4). With the catalyst prepared, polymerization was carried out in the same manner as in Example 1. The results are represented in Table 1.

EXAMPLE 4

The preparation of a catalyst was carried out in the same manner as in Example 1, except that the temperature during washing the catalyst with ethyl dichloride was 50° C. in the step (4). With the catalyst prepared, polymerization was carried out in the same mariner as in Example 1. The results are represented in Table 1.

EXAMPLE 5

The preparation of a catalyst was carried out in the same manner as in Example 1, except that the temperature during washing the catalyst with ethyl dichloride was 110° C. in the step (4). With the catalyst prepared, polymerization was carried out in the same manner as in Example 1. The results are represented in Table 1.

COMPARATIVE EXAMPLE 1

The preparation of a catalyst was carried out in the same manner as in Example 1, except that the catalyst was not washed with ethyl dichloride in the step (4). With the catalyst prepared, polymerization was carried out in the same manner as in Example 1. The results are represented in Table 1.

TABLE 1

|  | The number of washing times | Temperature during washing (° C.) | Polymerization activity (kgPP/g of catalyst) | II (NMR) |
|---|---|---|---|---|
| EXAMPLE 1 | 2 | 90 | 26 | 95.4 |
| EXAMPLE 2 | 3 | 90 | 22 | 95.4 |
| EXAMPLE 3 | 1 | 90 | 23 | 95.2 |
| EXAMPLE 4 | 2 | 50 | 21 | 95.1 |
| EXAMPLE 5 | 2 | 110 | 17 | 94.7 |
| COMPARATIVE EXAMPLE 1 | — | — | 20 | 94.1 |

The value I I (Isotactic Index) determined by NMR analysis is used as an important indicator for determining the stereoregularity of a polymer and can be quite precisely measured. From the Table 1, it can be found that the difference between the I I (NMR) values of Example 1 and Comparative Example 1 is 1.3%. Such level of difference is large enough 10 to cause great differences in impact strength, tensile strength, etc. in products made by the polymer. Therefore, it can be known from the results that the stereoregularities of the polymers have been significantly improved by the washing process of the present invention.

What is claimed is:
1. A method of preparing a solid titanium catalyst for olefin polymerization comprising the steps of:
   (1) preparing a magnesium compound solution by dissolving magnesium halide compound in a solvent mixture of cyclic ether and one or more alcohol;
   (2) preparing a carrier by adding titanium halide compound represented by the general formula (I) to said magnesium compound solution at a temperature range of −10° C. to 30° C., wherein a molar ratio of the titanium halide compound to the cyclic ether is 3.0 to 10, then elevating the temperature of the solution and aging the solution to precipitate particles, and then adding titanium halide compound thereto for further reaction:

$$\text{Ti(OR)}_a X_{(4-a)} \qquad (I)$$

wherein, R is an alkyl group having 1–10 carbon atoms, X is a halogen atom, and a is an integer of 0–3;
   (3) preparing a catalyst by reacting said carrier with titanium compound and electron donor; and
   (4) washing said catalyst with halogenated saturated hydrocarbon.

2. The method of preparing a solid titanium catalyst for olefin polymerization according to claim 1, wherein said cyclic ether used in step (1) is tetrahydrofuran or 2-methylhydrofuran, and said alcohol has 2–10 carbon atoms.

3. The method of preparing a solid titanium catalyst for olefin polymerization according to claim 1, wherein said halogenated saturated hydrocarbon used in step (4) is ethyl chloride, ethyl dichioride, chloroform, tert-butyl chloride, tetrachloromethane, ethyl bromide, tert-butyl iodide, n-butyl bromide, n-butyl iodide or n-butyl fluoride.

4. The method of preparing a solid titanium catalyst for olefin polymerization according to claim 1, wherein the washing in step (4) is carried out at the temperature of 10° C.–120° C.

* * * * *